United States Patent [19]
Wickert

[11] 3,957,646
[45] May 18, 1976

[54] INSTALLATION FOR REMOVING POLLUTANTS FROM WATERWAYS

[76] Inventor: Forrest M. Wickert, 1224 Argyle Drive, North Madison, Ohio 44057

[22] Filed: Sept. 6, 1974

[21] Appl. No.: 503,729

[52] U.S. Cl. .................... 210/242 S; 210/DIG. 25
[51] Int. Cl.² ......................................... E02B 15/04
[58] Field of Search ............. 210/119, 121, 83, 242, 210/DIG. 21

[56] References Cited
UNITED STATES PATENTS

| | | | |
|---|---|---|---|
| 1,591,024 | 7/1926 | Dodge | 210/242 |
| 2,330,508 | 9/1943 | McColl | 210/242 |
| 3,269,155 | 8/1966 | Shaw | 210/121 |
| 3,656,619 | 4/1972 | Ryan et al. | 210/DIG. 21 |
| 3,675,771 | 7/1972 | McKee | 210/242 |
| 3,703,463 | 11/1972 | Bhuta et al. | 210/DIG. 21 |
| 3,708,070 | 1/1973 | Bell | 210/242 |
| 3,727,766 | 4/1973 | Home et al. | 210/242 |
| 3,730,346 | 5/1973 | Prewitt | 210/DIG. 21 |
| 3,752,317 | 8/1973 | Lithen | 210/242 |
| 3,754,653 | 8/1973 | Verdin | 210/242 |
| 3,815,751 | 6/1974 | Pavlovic | 210/242 |
| 3,822,789 | 7/1974 | Crisadylli | 210/DIG. 21 |

*Primary Examiner*—Theodore A. Granger
*Attorney, Agent, or Firm*—Teare, Teare & Sammon

[57] ABSTRACT

A floating installation for the recovery of a liquid pollutant, such as petroleum or the like, from navigable waterways, including a main vessel adapted for floating movement in the water. A receiving tank is operably connected to the main vessel, having a scoop hingedly connected thereto for skimming the liquid pollutant from the water surface as the vessel moves relative thereto. The scoop is equipped with buoys for controlling the level of the inlet end of the scoop with respect to the water surface. The opposite or discharge end of the scoop is connected to the receiving tank for discharging the collected liquid pollutant therein. The receiving tank is mounted for movement relative to the main vessel, such that it can float in the water independently of the main vessel. A primary separation means including settling tanks are supported on the main vessel to receive the collected pollutant and for separation of the water collected with the pollutant. A secondary separating means is connected to the settling tanks for selectively separating the remaining water from the pollutant after the primary separation and for discharging the water from the vessel while transferring the recovered pollutant to storage tanks for subsequent further refinement and use, as required.

34 Claims, 13 Drawing Figures

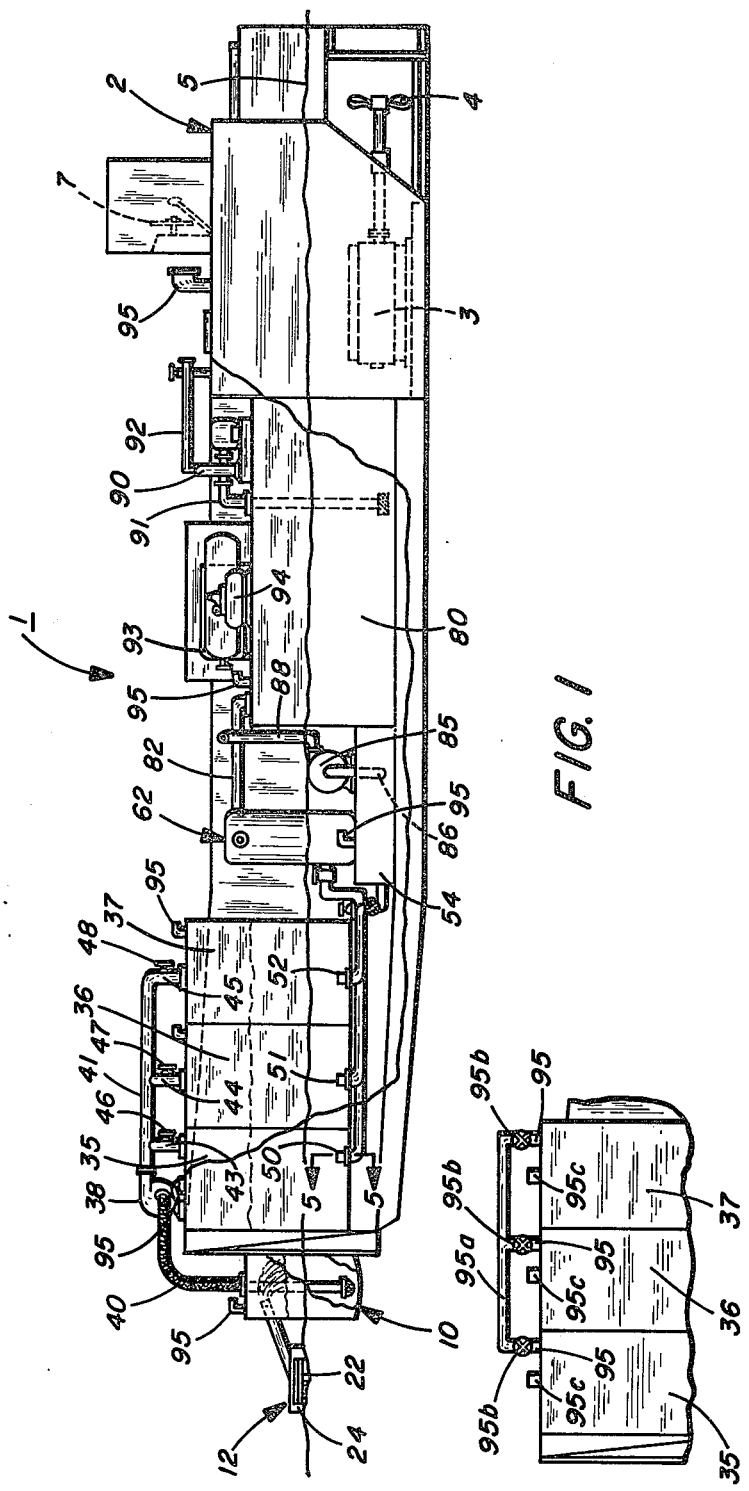

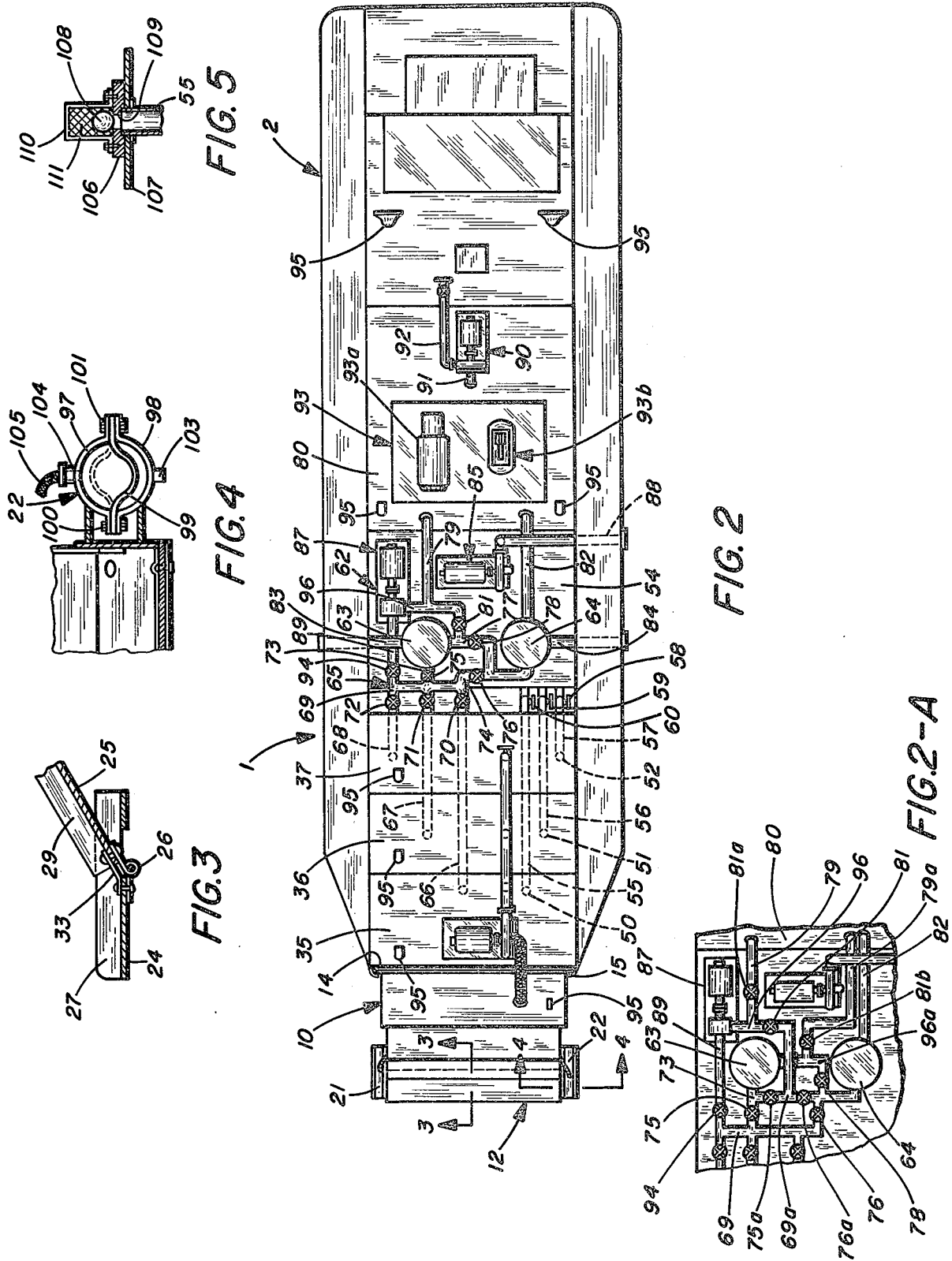

3,957,646

INSTALLATION FOR REMOVING POLLUTANTS FROM WATERWAYS

BACKGROUND OF THE INVENTION

The present invention relates to installations for the recovery of liquid pollutants floating on the surface of water, for example, petroleum, and particularly the recovery and preliminary refinement of the collected pollutant so as to provide a nearly usable petroleum product.

Occasionally, large volumes of petroleum are discharged into navigable streams and waterways as the result of either accidental discharge from a petroleum carrying tanker, or an off-shore drilling rig. In such instances a pollutant results which usually consists of a pure petroleum and a petroleum scum or sludge which floats onor near the surface of the water. In addition to the large financial loss which can result from the loss of such large quantities of petroleum itself, the substantial damage can result to the marine life and the shoreline adjacent to the vicinity where such accidents occur. As a result, it is extremely desirable to remove the pollutant from the surface of the water before any substantial damage can occur. Not only is the recovery of the petroleum desirable, it is also important that the recovery cost be maintained at a minimum, and that the recovered petroleum be relatively pure so that little or no further processing be required in order to render it usable.

SUMMARY OF THE INVENTION

The present invention contemplates providing an improved installation for the recovery of spilled petroleum from navigable streams or waterways. More particularly, the installation comprises a main vessel adapted to be propelled along the stream or waterway and is equipped with a receiving tank for receiving the pollutant thereon. The receiving tank is supported by the main vessel so as to enable it to float independently thereof. A scoop assembly is operably connected to the receiving tank for skimming the pollutant from the surface of the water and discharging the pollutant into the receiving tank. The scoop assembly including a scoop portion is hingedly connected to the receiving tank to enable the scoop portion to float on the water surface for movement relative to and independently of the receiving tank. An adjustable buoy assembly is mounted on the scoop assembly for controlling the depth of the scoop portion with respect to the surface of the water, depending on the depth to which the pollutant has reached below the surface of the water. A separation assembly is mounted on the main vessel, being connected in fluid communication to the receiving tank. The separation assembly includes a primary separation unit adapted to separate the collected pollutant by gravity into a substantially-water component and a substantially-pollutant component and a secondary separation unit connected in fluid communication with the primary separation unit for receiving the substantially-pollutant component for physically separating the remaining water therefrom. The primary separator unit comprises a series of settling tanks and a selectively actuatable pump assembly which interconnects the receiving tank in fluid communication with the settling tanks for controlling the rate of flow or pollutant therebetween. The primary separation unit further includes a float valve assembly adapted to open when submerged in a liquid having a specific gravity approximately equal to that of pure water and adapted to close when submerged in a liquid which is less than approximately that of pure water. The float valve assembly includes manifold means for selectively discharging the separated substantially pure water from the settling tanks and for conveying the remaining substantially-pollutant component to the secondary separator unit. The secondary separator unit comprises a rotary separation device, such as a centrifuge, or the like, which acts to further separate the remaining water from the pollutant. A storage tank is connected in fluid communication to the rotary separation device for receiving the substantially water-free pollutant therefrom. The storage tank is equipped with a discharge pump assembly for delivering the stored water free pollutant, at a subsequent time, to a storage location remote from the vessel for later use.

BRIEF DESCRIPTION OF THE DRAWINGS

FIG. 1 is a side elevation view partially cut away and partially in section of the pollution removal installation of the present invention, showing one form of scoop assembly;

FIG. 1A is an elevation view of the settling tanks at the invention.

FIG. 2 is a top plan view of the pollutant removal installation of the present invention;

FIG. 2A in a top plan view of an alternative pump assembly system similar to that in FIG. 2.

FIG. 3 is a transverse sectional view taken along the line 3—3 of FIG. 2;

FIG. 4 is a transverse sectional view taken along the line 4—4 of FIG. 2;

FIG. 5 is a transverse sectional view taken along the line 5—5 of FIG. 1;

DESCRIPTION OF THE PREFERRED EMBODIMENTS

Referring now again to FIG. 1, there is illustrated, generally at 1, an installation in accordance with the present invention. There is shown at 2 a vessel equipped with a conventional engine 3 having a propeller 4 for propelling the vessel through water, the surface of which is indicated at 5. The vessel 2 may be equipped with a conventional steerage assembly as at 7, for directing the vessel through the water. The vessel may be of a newly constructed vessel specially designed to carry the necessary equipment to carry out the present invention, or it may be of a used vessel which is reconverted for mounting of such equipment. For example, one type of vessel which could be readily converted and be very suitable for use in carrying out the present invention would be a vessel normally referred to as an LCM, or landing craft medium, employed by all branches of U.S. military including the Coast Guard. Such a vessel has a relatively large deck area and can carry relatively large loads with comparatively less draft than other types of vessels. Of course, other types of vessel construction can be employed and will be obvious to those skilled in the art, depending upon the size of the vessel and the particular waters on which the vessel is to be used. In any event, use of the materials and components, to be referred to hereinafter, are to be constructed in accordance with the U.S. Coast Guard specifications and standards where applicable.

Figure 6:
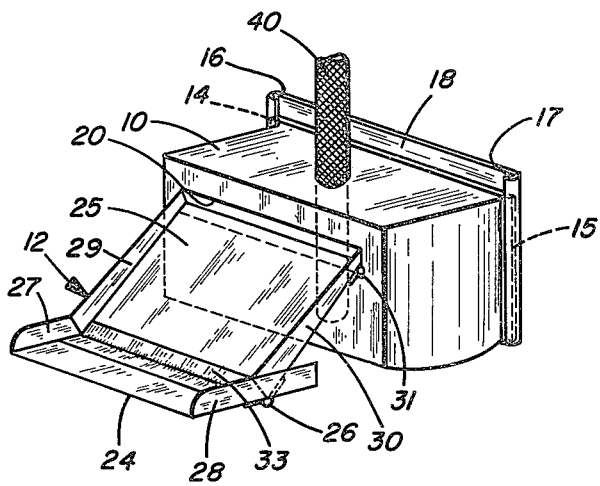
FIG. 6 is a perspective view of one form of receiving tank which can be used in carrying out the present invention.
Figure 7:
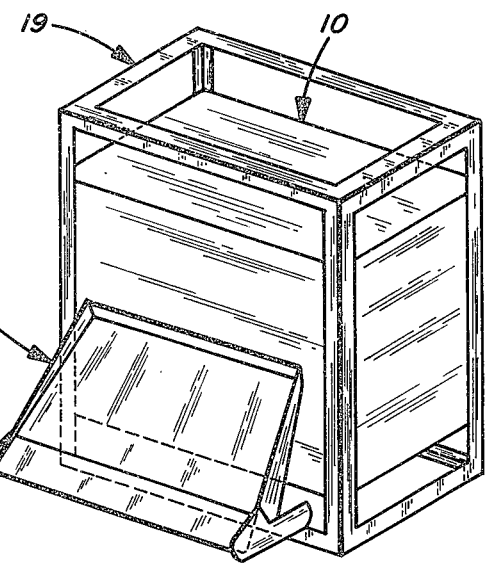
FIG. 7 is a perspective view of another form of receiving tank which can be used in carrying out the present invention.

Referring now to FIGS. 1 and 2, a receiving tank 10 is mounted forwardly of the bow of the boat and has an articulated scoop assembly 12 pivotally connected to the front side thereof. The rear side of the receiving tank is mounted for upward and downward movement relative to the bow of the boat so that the receiving tank 10 may float independently of the vessel 2. In the form shown, flanges 14 and 15 project outwardly from the rear side of the receivng tank being slidably disposed within the recesses or slots 16 and 17 formed by bending back the opposite edges of a plate 18 mounted adjacent the bow end of the boat. Of course, other means of enabling the receiving tank to move relative to the bow will be obvious to those skilled in the art in order to carry out the present invention. For example, the receiving tank 10 may be mounted within a frame 19, as shown in FIG. 7 for sliding movement up and down therein. As shown in FIG. 6, the receiving tank 10 includes a slot or opening 20 for receiving pollutant therein. The slot 20 is disposed at the upper side of the receiving tank 10 and may extend from side to side thereof.

Figure 8:
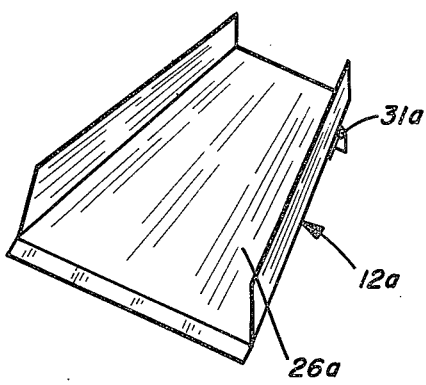
FIG. 8 is a perspective view of another form of scoop assembly which can be used in carrying out the present invention.

The scoop assembly 12 is provided in a two-piece construction including a scooping portion 24 adapted for selective positioning with respect to the surface of the water for effectively skimming the pollutant therefrom, while minimizing the quantity of water taken in with the pollutant, as will be described in more detail hereinafter. The scoop assembly further includes ramp portion 25 which extends upwardly into the opening 20 in the receiving tank 10. As best shown in FIGS. 3 and 6, the scooping portion 24 is pivotally connected to the ramp portion 25 by hinge connection so that the scooping portion 24 may pivot relative to the ramp portion 25. The scooping portion 24 and ramp portion 25 have upstanding side plates 27, 28, 29 and 30 respectively for directing the pollutant through the opening 20 into the receiving tank 10. As shown in FIG. 1, buoys 21 and 22 are mounted on the scooping portion 24 so that it will float in a level position on the surface of the water. The rear edge of the ramp portion 25 is pivotally connected, such as by a hinge 31, to the receiving tank 10 at the lower side of the opening 20 to enable the ramp portion 25 to pivot with respect to the receiving tank 10 to allow the scooping portion 24 to float at the surface of the water as the receiving tank 10 moves upwardly and downwardly with respect to the bow of the boat, depending upon the volume of pollutant contained therein. A flexible cover 33 is disposed in covering relation over the juncture between the scooping portion 24 and the ramp portion 25 to prevent leakage of the pollutant therebetween. The articulated scoop assembly 12 is primarily designed for use in waters which are not still. In FIG. 8 there is illustrated another form of scoop assembly 12A which comprises only an inclined ramp portion 20A. Thus, it is desirable to have some form of float control to control the level of the inlet end of the ramp portion 26A with respect to the surface of the water. A hinge 31A is attached to the ramp portion 26A for connection to the receiving tank 10 to allow the ramp portion 26A to pivot relative to the settling tank 10.

Referring now specifically to FIGS. 1 and 2, a series of settling tanks 35, 36 and 37 are mounted on the vessel 2 which function as a primary separation unit. A pumping unit 38 is mounted on the vessel having its intake end connected through a flexible conduit 40 and its outlet end connected to a distribution manifold 41. The conduit 40 is secured to and extends downwardly into the receiving tank 10 for drawing the pollutant therefrom. The distribution manifold includes a main conduit 42 having branch conduits 43, 44 and 45 extending therefrom. The branch conduits are connected in fluid communication to settling tanks at their top side for discharging the pollutant therein. Each of the branch conduits is equipped with a valve 46, 47 and 48 selectively shutting off the flow of pollutant to any one of the settling tanks, as desired.

Because the aforementioned pollutants will have a specific gravity less than water and are not readily combinable with water, the liquid in the settling tanks will tend to separate with the pollutants moving to the top and the water settling to the bottom. Float valves 50, 51 and 52 are mounted at the bottom of the settling tanks 35, 36 and 37, respectively, for being adapted to open for draining off the portion of the liquid in the settling tanks which is substantially pure water, and are adapted to close when the specific gravity of the remaining liquid is less than that of water. The float valves 50, 51 and 52 are each connected in fluid communication with a holding tank 54 by conduits 55, 56 and 57 respectively. Each of the conduits 55, 56 and 57 have valves 58, 59 and 60 for selectively closing off the flow of liquid from the settling tanks into the holding tank 54. A holding tank 54 may be equipped with a filtration unit, as well known in the art, for removing the pollutants which remain in the water which flows into the holding tank 26. The quality and character of the pollutants collected by the filter unit will determine whether or not such will be discarded or further processed.

A secondary separation unit 62 is provided to separate the remaining pollutant in the separation tanks after the initial removal of the substantially pure water component. As best shown in FIG. 2, the secondary separation unit includes a pair of centrifuges 63 and 64. The centrifuge 63 is connected by means of a manifold assembly 65 to the settling tanks 35, 36 and 37, such as by conduits 66, 67 and 68, respectively. In the form shown, the conduits 66, 67 and 68 each includes a valve 70, 71 and 72, respectively, for closing off the flow of pollutant therethrough. As shown, the conduits 66, 67 and 68 flow into a manifold conduit 69. An inlet conduit 73 connects the manifold conduit 69 to the input of the centrifuge 63, and another inlet conduit 74 connects the manifold conduit 69 to the centrifuge 64. Valves 75 and 76 are connected in the conduits 73 and 74, respectively, for controlling the flow of pollutant therethrough. Another conduit 77 is connected between the conduit 74 and the outlet of the centrifuge 63 having one end connected to the conduit 74 between the valve 76 and the inlet to the centrifuge 64. A valve 78 is connected in the conduit 77 for controlling the flow of fluid therethrough. A discharge conduit 79 is connected between the conduit 77 and a storage tank 80 having one end connected to the conduit 77 between the outlet of the centrifuge 63 and the valve 78. A valve 81 controls the flow through the conduit 79. Although all of the aforementioned valves are shown as being manually operable, such valves may be operated automatically in a manner well known in the art to automatically control the flow from the settling tanks 35, 36 and 37 into the centrifuges 63 and 64. In addition, all of the above valves may be electrically connected to switch assemblies in the valves 50, 51 and 52, as well known in the art to automatically operate the valves upon the closing and opening of the float valves 50, 51 and 52. By this arrangement, the centrifuges 63 and 64 can be operated in series of parallel, or even independently of one another. For example, when the valves 76 and 81 are closed and the remainder of the valves are open, the centrifuges will be connected for series operation. When the valve 78 is closed and the remainder of the valves are open, the centrifuges will be connected for parallel operation. When the valves 73 and 78 are closed and the remainder of the valves are open, the centrifuge 64 will be connected for independent operation, and when the valves 76 and 78 are closed and the remainder of the valves are open, the centrifuge 63 will be connected for independent operation. Thus, the centrifuges 63 and 64 may be interconnected to obtain the degree and quantity of separation required.

As shown in FIG. 1, and as stated previously, the outlet of the centrifuge 63 is connected to the storage tank 80 by the discharge conduit 79 for discharging substantially pure petroleum therein. Another discharge conduit 82 connects the outlet of the centrifuge 64 to the storage tank 80 for the same purpose. Further, each of the centrifuges includes another outlet for the discharge of substantially pure water. Conduits 83 and 84 are connected to such outlets for directing the water to the side of the vessel for discharge into the surrounding water.

A pump assembly 85 is mounted on the vessel having its intake end connected to a conduit 86 which extends into the holding tank 54 and its outlet end connected to another conduit 88 for drawing the substantially pure water from the holding tank 54 for discharge from the vessel. Another pump assembly 90 is mounted on the vessel having its intake end connected to a conduit 91 which extends into the storage tank 80 and its discharge end connected through a conduit 92 for drawing the substantially water-free pollutant away from the vessel 2. The conduit 92 may be of the flexible-type so as to facilitate manipulation thereof for connection to conduits or storage facilities external of the vessel, as required.

Referring again to FIG. 2, a bypass system may be provided by bypassing both of the centrifuges 63 and 64 when the pollutant is substantially pure petroleum and separation is not required In the form shown, the bypass system includes another pump assembly 87 to provide additional pumping pressure to pump the pollutant from the tanks 35, 36 and 37. More particularly, a bypass conduit 89 connects the inlet of the pump assembly 87 to the manifold contuit 69. A valve 94 is connected in the bypass conduit 89 to control the flow of pollutant therethrough. Another conduit 96 connects the outlet of the pump assembly 87 to the discharge conduit 79 on the discharge side of the valve 81. By this arrangement, when substantially pure petroleum is present in the settling tanks, the valve 94 is opened, and the valves 70, 73 and 81 are closed so that the pollutant will be pumped by the pump assembly 87 through the conduits 89, 96 and 79 directly into the storage tank 80, and thus, bypass the centrifuges 63 and 64. Of course, under certain conditions the pressure in the system resulting from gravity alone will be sufficient to discharge the substantially pure pollutant from the tanks 35, 36 and 37, and thus, the utilization of the pump 87 may not be required.

In the alternative arrangement shown in FIG. 2A, the pump assembly 87 is employed to provide additional pumping pressure to move the pollutant through the centrifuges 63 and 64. More particularly, the outlet conduit 96 of the pump assembly 87 may be connected into a secondary manifold conduit 69a. One end of the conduit 96a is connected to the conduit 73 on the outlet side of the valve 75 for distributing the pollutant through the inlet of the centrifuge 63. The opposite end of the conduit 69a is connected to the inlet of the centrifuge 64, A valve 75a is connected in the conduit 69a between the conduit 73 and the junction of the conduit 69a and 96. Another valve 76a is connected in the conduit 69a between the inlet of the centrifuge 64 and the junction of the conduits 69a and 96. Further, a series conduit 96a connects the outlet of the centrifuge 63 on the outlet side of the valve 76a to transmit the pollutant between the centrifuges 63 and 64. A discharge conduit 79a is connected into the conduit 96a for discharging the pollutant from the centrifuge 63 into the storage tank 80. The valve 78 is connected in the conduit 96 between the conduits 69a and the junction of the conduit 79a and 96a for shutting off the flow through the conduit 96a. A valve 81b is connected in the conduit 79a to shut off the flow of pollutant to the storage tank 80. By this arrangement, when the valve 75 and 76 are closed, and the valve 94 is opened, the pollutant will flow from the manifold conduit 69 through the conduit 89 to the pump assembly 87. By closing the valve 81 and opening the valve 81a, the pollutant can be pumped direct to the storage tank 80. On the other hand, when it is desired to pump the pollutant to the centrifuges 63 and 64 for parallel separation, the valve 81a is closed, and the valve 81 is open, so that the pollutant can be pumped to the conduit 69a. When the valves 75a and 76a are opened, the pollutant will flow to both of the centrifuges 63 and 64 for discharge to the storage tank 80 through the discharge conduits 79a and 82 respectively. On the other hand, when the valves 76a and 81b are closed, and the valve 78 is opened, the centrifuges 63 and 64 will be connected in series, and the pollutant will flow into the centrifuges 63, then to the conduit 96a to the centrifuges 64 from which it will be discharged to the storage tank 80 to the conduit 82. The system shown in FIG. 2A will operate similar to that shown in FIG. 2 when the pump assembly 87 is disconnected from the system by closing the valve 94 so that the centrifuges 63 and 64 can be operated independently in series or parallel.

In another modification of the present invention shown in FIG. 1a, all of the settling tanks 35, 36 and 37 may be atmospherically sealed and have their air vents, such as 95, connected to a common vent manifold 95a to allow the transfer of air therebetween. Each of the tank vents 95 may be equipped with a valve 95b, which may be manually or automatically operated, as desired, to selectively close off any one of the vents 95, and therefore, enable the air from any one or more tanks to be transferred to any one or more of the other tanks. Pressure relief valves 95b should be provided for each of the settling tanks 35, 36 and 37 in the event that the pressure in the tanks exceeds a predetermined maximum magnitude. As can be seen, in a typical operation of the aforedescribed modification, a pollutant may be pumped from the receiving tank into one of the tanks, for example, the settling tank 35, when the vent valve 95b of the settling tank 37 is closed. When the valve 70 and 72 are closed, the air from the tank 35 will be forced into the common vent manifold 95a, and then into the settling tank 36 to force the pollutant therein from the tank 36 to the centrifuges 63 and 64. Of course, it is understood that any combination of the valves may be opened and closed to obtain flow from any one or more tanks to any one or more of the other tanks. By this arrangement, additional pressure may be provided in the system by the pump 38 to supplement the pressure provided by the gravity flow operation or to supplement the pump assembly 87 when such is connected in the system.

The vessel is arranged so as to be self-contained and includes a power unit 93 in the form of a diesel engine-generating unit 93a for supplying the electrical power requirements of the vessel. An air compressor 93b is provided to provide the compressed air requirements of the vessel wherever required. Although it is not shown in every instance all of the aforementioned tanks should be equipped with suitable vents, such as at 95, to enable the tanks to be vented of any toxic or explosive fumes or gasses which may accumulate in the tanks during the recovery process. In addition, all of the tanks should be equipped with access doors or covers (not shown) to enable cleaning thereof.

Referring now to FIG. 4, the buoys 21 and 22 are provided in the form of air tanks which are generally cylindrical in transverse cross section. As shown, each of the tanks is formed to have an upper section 97 and lower section 98. In the form shown, the sections 97 and 98 are generally semi-circular in transverse cross section, having a flexible diaphragm 99 disposed therebetween and held in position by suitable fasteners, such as at 100 and 101. As further shown, a lower section 97 is provided with an inlet opening 103 for receiving water therein, whereas the upper section 97 is equipped with an inlet opening 104 which is connected to the output of the compressor 93b by a conduit 105 for receiving compressed air therefrom. A selectively-actuatable valve assembly (not shown) as well known in the art may be connected between the compressor 93b and the inlet 104 for controlling the flow of compressed air into the tank 22. With this arrangement, the tank 22 may be evacuated or filled with compressed air as desired for controlling the quantity of water flowing into and out of the inlet 103 for controlling the level of the tank 22 in the water, and thus the position of the leading end of the scopping portion 24 with respect to the water level. This is of importance in that the depth of the pollutant with respect to the water surface will vary depending upon the form of the pollutant and the period of time which the pollutant has been in the water. It has been found that the pollutant will vary in depth from the surface in a range from a fraction of an inch to 3 or 4 inches. By selectively controlling the depth of the scoop member, and efficient method is provided for minimizing the quantity of pure water taken in with the pollutant during the scooping process.

Referring now to FIG. 5, the float valves, such as at 50, are preferably of the ball-type and include a base 106 which is secured to the bottom wall, such as at 107, of the settling tanks, such as 35, in any suitable manner, such as by welding or the like. The base 106 includes a central orifice 109 which is connected in fluid communication to the discharge conduit, such as 55. The orifice 109 is preferably circular in transverse section, having its upper marginal edges providing a seat for receiving a ball 108 in seated engagement therewith. A frame 110 is mounted over the orifice 107 and supports a screen 111 to enable the free flow of the liquid in the settling tank through the screen and into the discharge conduit 55 and containing the ball 108. The ball 108 is weighted and sized such that it will float in a liquid material having a specific gravity of approximately that of water, whereas it will not float in a liquid having a specific gravity which is less than that approximately equal to the specific gravity of water. By this arrangement, the valve will open when the ball 108 is submerged in substantially pure water and will close when the substantially pure water has been drained from the settling tank and a substantially petroleum base liquid remains.

In the event that the present invention is modified in accordance with the arrangement shown in FIG. 1A, the ball float valves 50, 51 and 52 may not necessarily operate effectively, and thus, such ball float valves may be either modified to include mechanical locking arrangements so as to selectively prevent their opening, or mechanically operative valves may be substituted therefor which may be operated in conjunction with the settling tank vent valve 95b. As the solution which will be passing from the receiving tank 10 through the pump 38 and into the settling tanks 35, 36 and 37, may be well mixed, the modification of the float valves or the substitution of the mechanical valves is considered advisable to avoid the contamination of the system for discharging substantially pure water from the settling tanks and to assure that the outlet valves 50, 51 and 52, of the settling tanks 35, 36 and 37 are in a closed position until the tanks are ready for processing.

Figure 10:
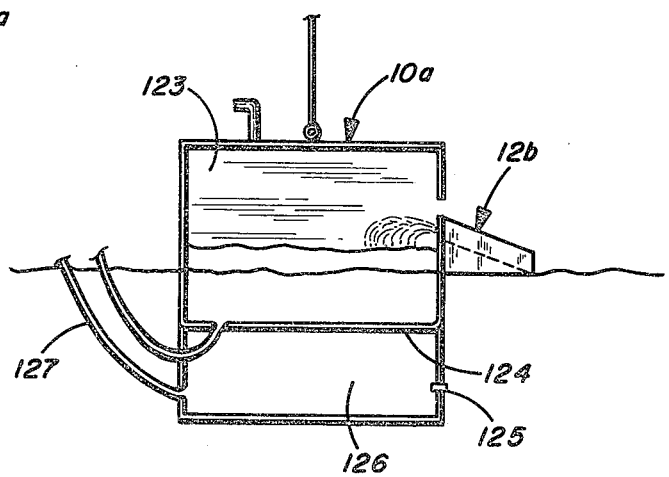
FIG. 10 is a transverse sectional view taken along line 10—10 of FIG. 9.
Figure 9:
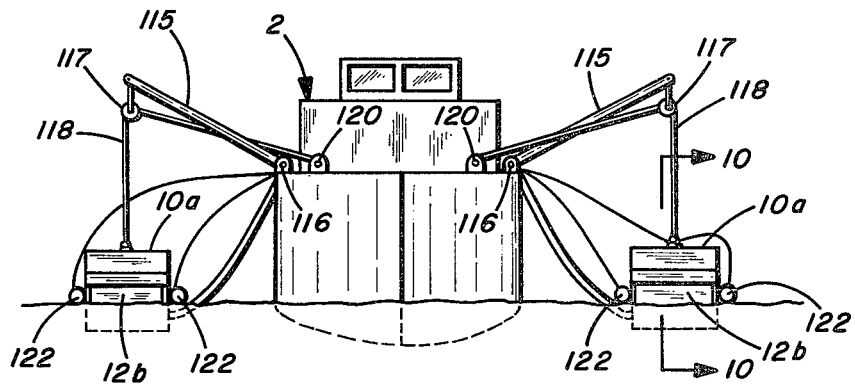
FIG. 9 is a front elevation view of another embodiment of the pollution removing installation of the present invention showing another form of rigging for supporting the receiving tank of the present invention.

Referring now to FIGS. 9 and 10, there is shown still another embodiment of the present invention. In this form, multiple receiving tanks 10a are utilized in collecting the pollutant. As shown in FIG. 9, each of the receiving tanks 10a is supported outwardly from the vessel 2 by a boom 115 which is pivotally connected at its inner end to a vessel 2 and projects outwardly therefrom. A pulley 117 is supported adjacent the opposite outer end of each boom 115 which in turn support a cable 118. Each cable 118 is attached at one end to the receiving tank 10a and has its other end operably connected to a suitable winch mechanism 120 for selectively raising and lowering the receiving tank 10a into and out of the water. In this form of the invention, each receiving tank 10a may be equipped with a scoop assembly 12b which is rigidly mounted thereon. Buoys 122 in the form of air tanks similar to the air tanks 21 and 22 described above, may be mounted on the opposite sides of the receiving tanks 10a for selectively controlling the level of the leading edge of the scoop assembly 12b with respect to the surface of the water. In addition, the receiving tanks 10a may be formed with a receiving chamber 123 adjacent the upper end into which the pollutant flows as it enters the receiving tank 10a. A dividing wall 124 may be rigidly secured within the receiving tank forming an air chamber 126 below the receiving chamber 123. An inlet opening 125 is provided in the air chamber 124 to enable water to flow into an out of the air chamber 124. An air line 127, supplied with pressurized air from the compressor 94, is connected in fluid communication to the air chamber 124 for purging the water from the chamber 124 to provide further control for adjusting the level of the receiving chamber 10a in the water in response to the guantity of pollutant contained in the receiving chamber 123. Of course, it would be apparent to one skilled in the art that the receiving chamber 10 described in FIGS. 1 and 2 having an articulated scoop assembly 12 could also be readily adapted and substituted for the receiving chamber 10a in the embodiment shown in FIG. 9.

Figure 11:
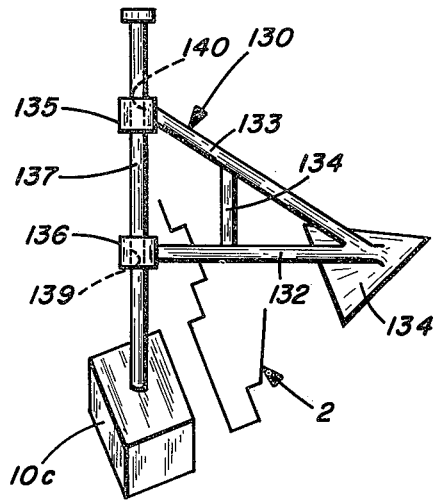
FIG. 11 is a perspective view of another form of rigging which can be used in carrying out the present invention.

Referring now to FIG. 11, there is shown another arrangement for supporting multiple receiving tanks, such as 10c, on a vessel 2. In the form shown, a framework 133 is provided which includes a generally horizontal extending arm 132 and an angularly upwardly extending arm 133. The inner ends of the arms 132 and 133 are connected together by a plate 134 which is mounted on the side of the vessel 2. A brace 134 extends between the arms 132 and 133 and supports the outer ends in spaced relation from one another. Slide blocks 135 and 136 are supported at the outer ends of the arms 133 and 132 respectively, for supporting an elongated, generally vertically-oriented column 137. More specifically, the slide blocks 135 and 136 have openings 139 and 140 which are axially aligned in the vertical direction for slidably receiving the column 137 therein. A lower end of the column 137 is connected to the top side of a receiving tank 10a. By this arrangement, the receiving tank 10a is free to float in the water alongside of the vessel 2 with the column 137 sliding up and down in the sliding blocks 135 and 136.

I claim:

1. An installation for the removal and recovery of pollutants from waterways, comprising
   a main vessel adapted for movement on the surface of the waterway,
   a receiving tank supported by said vessel being movable relative to the surface of said waterway and to said vessel and adapted to collect pollutant therein,
   a scoop assembly mounted on and projecting outwardly in one direction from said receiving tank and having an inner end connected in fluid communication with said receiving tank and an outer end adapted to be disposed below the surface of the waterway for scooping the pollutant from the surface of the waterway and directing it into said receiving tank along with any water collected therewith,
   a primary separation unit on said vessel for separating, by gravity, said pollutant from the water collected from the waterway,
   a first transfer assembly connecting said primary separation unit in fluid communication with said receiving tank for transferring said pollutant from said receiving tank to said primary separation unit,
   a secondary separation unit on said vessel,
   a second transfer assembly connecting said primary separation unit in fluid communication with said secondary separation unit for transferring the separated pollutant from said primary separation unit to said secondary separation unit,
   said secondary separation unit includes means for mechanically separating the remaining water from said separated pollutant to provide a still purer pollutant,
   a third transfer assembly connected in fluid communication with said secondary separation unit for receiving said purer pollutant and being adapted for connection to a storage facility to enable storage of said purer pollutant for subsequent use thereof,
   said scoop assembly includes an upwardly inclined ramp portion for directing the collected pollutant and water into said receiving tank whereby the pollutant is forced up the ramp portion into said receiving tank upon movement of said vessel generally in said one direction, and
   said receiving tank supported by said vessel for independent floating movement in said waterway and relative to said vessel.

2. An installation in accordance with claim 1, wherein
   said scoop assembly is pivotally connected to said receiving tank to enable said scoop assembly to float on the surface of said waterway independently of said vessel.

3. An installation in accordance with claim 1, wherein
   said scoop assembly includes floatation means for floatingly supporting said scoop assembly in a predetermined position with respect to the surface of said waterway, and
   said scoop assembly is pivotally connected to said receiving tank to enable said scoop assembly to float on the surface of the water and move independently of said receiving tank.

4. An installation in accordance with claim 1, wherein
   said scoop assembly is of an articulated construction including a ramp portion adapted for directing the collected pollutant into said receiving tank and a scoop portion adapted to float on the surface of said waterway,
   said ramp portion is pivotally connected to said receiving tank to enable movement of said scoop assembly relative to said receiving tank, and
   said scoop portion is pivotally connected to said ramp portion to enable said scoop portion to float on the surface of said waterway as said scoop assembly pivots relative to said receiving tank.

5. An installation in accordance with claim 1, wherein
   said primary separation unit comprises at least one settling tank for receiving said pollutant and water collected in said receiving tank.

6. An installation in accordance with claim 5, wherein
   said second transfer assembly comprises at least one float valve in said settling tank for controlling the flow of pollutant and water from said settling tank.

7. An installation in accordance with claim 6, including
   locking means operably connected to said float valves to prevent opening of said float valves to enable preliminary separation of said pollutant from said water in said settling tank.

8. An installation in accordance with claim 1, wherein
said primary separation unit includes a plurality of settling tanks, and
said first transfer assembly includes a distribution manifold for selectively transferring the pollutant and water collected therewith from said receiving tank to said settling tanks.

9. An installation in accordance with claim 8, wherein
said settling tanks are of a sealed construction,
manifold vent means connects the respective interiors of said settling tanks with one another, and
selectively actuatable valve means associated with each of said settling tanks to control the flow of air therebetween to selectively process the contents of any one or more of the settling tanks and increase the flow pressure of the pollutant in the separation units.

10. An installation in accordance with claim 1, including a
holding facility connected in fluid communication with said primary and secondary separation units, and
said second transfer assembly includes a distribution manifold for selectively transferring said water to said holding facility and said pollutant to said secondary separation unit.

11. An installation in accordance with claim 1, wherein
said receiving tank is slidably mounted on the bow of said vessel for movement up and down in a generally vertical direction.

12. An installation in accordance with claim 1, wherein
said vessel includes a boom assembly, and
said receiving tank is mounted outwardly of said vessel being connected to said boom assembly for maneuvering said receiving tank with said vessel along the surface of said waterway.

13. An installation in accordance with claim 12, wherein
multiple receiving tanks are connected to said vessel by said boom assembly.

14. An installation in accordance with claim 12, wherein
said receiving tank includes floatation means for floatingly supporting said scoop assembly in a predetermined position with respect to the surface of said waterway.

15. An installation in accordance with claim 14, wherein
said scoop assembly is pivotally connected to said receiving tank, and
floatation means is mounted on said scoop assembly for controlling the position of said scoop assembly with respect to the surface of said waterway.

16. An installation in accordance with claim 1, wherein
said secondary separation unit comprises at least one centrifuge for receiving said pollutant from said primary separation unit and separating the water from the pollutant.

17. An installation in accordance with claim 1, wherein
said secondary separation unit comprises a plurality of centrifuges connected in fluid communication with said primary separation unit, and conduit means connected to said centrifuges for operating said centrifuges independently, in series or in parallel with one another.

18. An installation in accordance with claim 1, including
a storage facility on said vessel connected in fluid communication with said third transfer assembly for receiving the purer pollutant from said secondary separation unit for storing said pollutant to enable subsequent use thereof.

19. An installation in accordance with claim 18, including
by-pass means for by-passing said secondary separation unit for distributing the contents of said primary separation unit directly to said storage facility when said contents is substantially pure water.

20. An installation in accordance with claim 1, including
pressure supplementing means connected to said secondary separation unit for increasing the flow pressure of the pollutant through the secondary separation unit.

21. An installation in accordance with claim 1, wherein
said scoop assembly is adjustably movable with respect to said receiving tank, and
said scoop assembly includes means operably connected thereto for positioning said outer end of said scoop assembly at a predetermined level with respect to the surface of said waterway.

22. An installation for the removal and recovery of pollutants from waterways, comprising
a main vessel for movement on the surface of said waterway,
a receiving tank mounted on said vessel being movable relative to the surface of said waterway and to said vessel and adapted to collect pollutant therein,
a scoop assembly mounted on and projecting outwardly in one direction from one said receiving tank and having an inner end connected in fluid communication with said receiving tank and an outer end adapted to be disposed below the surface of the waterway for scooping the pollutant from the surface of the waterway and directing it into said receiving tank along with any water collected therewith,
said receiving tank is supported by said vessel for independent floating movement in said waterway relative to said vessel,
said scoop assembly is adjustably movable with respect to said receiving tank and includes means operably connected thereto for positioning said outer end at a predetermined level with respect to the surface of said waterway,
said scoop assembly includes an upwardly inclined ramp portion for directing the collected pollutant and water into said receiving tank whereby the pollutant is forced up the ramp portion into said receiving tank upon movement of said vessel generally in said one direction,
a primary separation unit including settling tank means mounted on said vessel for separating, by gravity, said pollutant from the water collected from the waterway,
a first transfer assembly including a first pump means connecting said primary separation unit in fluid communication with said receiving tank for transferring, under pressure, said pollutant from said receiving tank to said settling tank means, a secondary separation unit on said vessel, a second transfer assembly including a second pump means connecting said settling tank means in fluid communication with said secondary separation unit for transferring the separated pollutant from said settling tank means to said secondary separation unit, said secondary separation unit includes mechanical means for mechanically separating the remaining water from said separated pollutant to provide a still purer pollutant, a storage facility on said vessel connected in fluid communication with said secondary separation unit for receiving said purer pollutant and, a third transfer assembly connecting said secondary separation unit in fluid communication with said storage facility for transferring said purer pollutant to said storage facility to enable storage of said purer pollutant for subsequent use thereof.

23. An installation for the removal and recovery of pollutants from waterways, comprising a main vessel adapted for movement on the surface of the waterway, a receiving tank supported on said vessel for collecting pollutant therein, said receiving tank being supported for independent floating movement in said waterway and relative to said vessel so that the tank may float at different levels with respect to the surface of the waterway depending upon the quantity of pollutant therein, a scoop assembly movably mounted on and arranged for independent movement relative to said receiving tank for removing the pollutant from the surface of the waterway and directing it into said receiving tank along with any water collected therewith, a primary separation unit including settling tank means on said vessels for separating, by gravity, said pollutant from the water collected from the waterway, a first transfer assembly including a first pump means connecting said settling tank means in fluid communication with said receiving tank for transferring, under pressure, said pollutant from said receiving tank to said settling tank means, a secondary separation unit on said vessel including means for further separating the remaining water from said previously separated pollutant, a second transfer assembly including a second pump means connecting said settling tank means in fluid communication with said secondary separation unit for transferring, under pressure, the previously separated pollutant from said settling tank means to said secondary separation unit, said settling tank means comprises a plurality of settling tanks, each having an inlet and outlet, said settling tanks are of a sealed construction, supplemental pressure means is operably connected bwtween said first pumping means and said settling tanks to facilitate the removal of the contents of said settling tanks, said supplemental pressure means including manifold means connecting the respective interiors of said settling tanks in fluid communication with one another, a first selectively actuatable valve means operably connected to the outlet of said settling tanks for selective controlling the tanks therethrough, and a second selectively actuatable valve means operably connected to the inlet of each of said settling tanks for selectively interconnecting one or more of said settling tanks with one another to control the flow of pollutant thereto whereby the pressure in those tanks having their outlets open is increased to increase the flow pressure of the pollutant therefrom.

24. A scooping apparatus for use in an installation for the removal and recovery of pollutants from waterways of the type including a vessel adapted for movement on the surface of the waterway, said apparatus comprising:

a receiving tank for collecting pollutant therein, mounting means connected to said receiving tank for mounting said receiving tank on said vessel and being adapted for attachment to said vessel, a scoop assembly mounted on and projecting outwardly in one direction from said receiving tank and having an inner end connected in fluid communication with said receiving tank and an outer end adapted to be disposed below the surface of the waterway for scooping the pollutant from the surface of the waterway and directing it into said receiving tank along with any water collected therewith, said scoop assembly includes an upwardly inclined ramp portion for directing the collected pollutant and water into said receiving tank whereby the pollutant is forced up the ramp portion into said receiving tank upon movement of said vessel generally in said one direction, said receiving tank being movably connected to said mounting means to enable independent floating movement of said receiving tank in said waterway and relative to said vessel whereby said receiving tank may float at different levels with respect to the surface of the waterway depending upon the quantity of pollutant therein, positioning means connected to said scoop assembly for positioning said outer end of said scoop assembly at a predetermined level with respect to the surface of said waterway, and said scoop assembly is movably mounted on said receiving tank whereby said scoop assembly can move relative to said receiving tank to maintain said outer end at said predetermined level with respect to the surface of the waterway as said receiving tank floats in said waterway and relative to said vessel.

25. A scooping apparatus in accordance with claim 24, wherein said scoop assembly includes a scoop portion adjacent said outer end, said scoop portion is pivotally connected to said ramp portion for directing pollutant onto said ramp, said scoop portion having a front end projecting outwardly in said one direction from said ramp portion, and said positioning means is connected to said scoop portion for positioning said front end of said scoop portion at a predetermined level with respect to the surface of said waterway.

26. A scooping apparatus in accordance with claim 25, wherein said scoop portion is hingedly connected to said ramp portion, said ramp portion is hingedly connected to said receiving tank, said receiving tank is slidably connected to said mounting means to enable sliding movement of said receiving tank relative to said vessel when said mounting means is connected to said vessel, said positioning means comprises air tanks adapted to be filled with water, said tanks including valve means to enable water to enter and be evacuated from said tanks, and said air tanks are connected to a source of pressurized air for controlling the quantity of water in said tanks to adjust the position of the front end of said scoop portion with respect to the level of said waterway.

27. A scooping apparatus in accordance with claim 24, wherein said receiving tank is slidably connected to said mounting means whereby said receiving tank may move relative to said vessel when connected to said vessel by said mounting means.

28. A scooping apparatus in accordance with claim 24, wherein said ramp portion is pivotally connected to said receiving tank.

29. A scooping apparatus in accordance with claim 24, wherein said positioning means comprises floatation means for positioning said scoop assembly at said predetermined level in said waterway.

30. A scooping apparatus in accordance with claim 29, wherein said floatation means comprises air tanks for adjustably controlling the position of said scoop assembly with respect to the level of said waterway.

31. An installation for the removal and recovery of pollutants from waterways, comprising a main vessel adapted for movement on the surface of the waterway, a receiving tank mounted on said vessel being movable relative to the surface of said waterway and to said vessel and adapted to collect pollutant therein, a scoop assembly mounted on and projecting outwardly in one direction from one said receiving tank and having an inner end connected in fluid communication with said receiving tank and an outer end adapted to be disposed below the surface of the waterway for scooping the pollutant from the surface of the waterway and directing it into said receiving tank along with any water collected therewith.

said receiving tank is supported by said vessel for independent floating movement in said waterway relative to said vessel, said scoop assembly is adjustably movable with respect to said receiving tank and includes means operably connected thereto for positioning said outer end at a predetermined level with respect to the surface of said waterway, said scoop assembly includes an upwardly inclined ramp portion for directing the collected pollutant and water into said receiving tank whereby the pollutant is forced up the ramp portion into said receiving tank upon movement of said vessel generally in said one direction, separation means on said vessel for separating said pollutant, from any water collected therewith, said separation means comprises a plurality of centrifuges, each centrifuge having an inlet, a water outlet and a pollutant outlet, a first conduit means connected in fluid communication between said receiving means and said inlet for directing said pollutant from said receiving means to said centrifuges, a second conduit means connected to said pollutant outlet for directing said separated pollutant from said centrifuges to a storage facility and for discharging said separated water, a third conduit means connected in fluid communication between the pollutant outlet of one of said centrifuges and the inlet of the other of said centrifuges for directing separated pollutant from said one centrifuge to the other centrifuge, selective-actuatable valve means including a plurality of valve operably connected to said conduit means for directing the flow therethrough, said valve means includes, a first valve group for closing-off said third conduit means and said inlet to said one centrifuge to prevent pollutant flow from said receiving means to said other centrifuge and from said one centrifuge to said other centrifuge for operating said centrifuges independently of one another when all of the other valves are open, a second valve group for closing-off the flow of said pollutant to said inlet of said other centrifuge and from said pollutant outlet of said one centrifuge to said storage facility, and opening up said third conduit means for flow from said one centrifuge to the other centrifuge for series operation of said centrifuges when all of the other valves are open, and a third valve group for closing off the flow through said conduit means when all other valves are open for parallel operation of said centrifuges.

32. An installation in accordance with claim 31, including a fourth conduit means connected in fluid communication to said first conduit means for directly discharging pollutant to said storage facility, and said valve means includes a fourth valve group for closingoff the flow of pollutant to said inlet of said centrifuge and opening-up said fourth conduit means for by-passing said centrifuges.

33. An installation in accordance with claim 32, including supplemental pump means operably connected in said fourth conduit means for providing supplemental pressure to the flow of pollutant from said first conduit means to said storage facility.

34. An installation in accordance with claim 31, including a fourth conduit means connected across said fourth valve group in fluid communication between said first conduit means and said inlet of said centrifuges, supplemental pump means operably connected in said fourth conduit means for increasing the flow pressure of said pollutant to said centrifuges when said third and fourth valve groups are closed and all other valves are open.

* * * * *

UNITED STATES PATENT AND TRADEMARK OFFICE
CERTIFICATE OF CORRECTION

PATENT NO. : 3,957,646
DATED : May 18, 1976
INVENTOR(S) : Forrest M. Wickert

It is certified that error appears in the above-identified patent and that said Letters Patent are hereby corrected as shown below:

Column 1, line 18, change "onor" to --on or--.

Column 3, line 25, change "receivng" to --receiving--.

Column 5, line 19, change "of" to --or--.

Column 5, line 62, place a period after "required".

Column 5, line 67, change "contuit" to --conduit--.

Column 7, line 61, change "scopping" to --scooping--.

Column 9, line 12, change "guantity" to --quantity--.

Column 13, line 62, change "bwtween" to --between--.

Column 16, line 47, change "closingoff" to --closing off--.

Signed and Sealed this

Nineteenth Day of October 1976

[SEAL]

Attest:

RUTH C. MASON
Attesting Officer

C. MARSHALL DANN
Commissioner of Patents and Trademarks